United States Patent [19]
Slayter

[11] Patent Number: 5,820,194
[45] Date of Patent: Oct. 13, 1998

[54] PASSENGER SLIDING TRAY

[75] Inventor: John D. Slayter, Elkhart, Ind.

[73] Assignee: Monaco Coach Corporation, Coburg, Oreg.

[21] Appl. No.: 538,259

[22] Filed: Oct. 3, 1995

Related U.S. Application Data

[63] Continuation-in-part of Ser. No. 033,891, Jan. 23, 1995, Pat. No. Des. 380,190.

[51] Int. Cl.⁶ .................................................... B62D 25/14
[52] U.S. Cl. ................................................ 296/70; 108/45
[58] Field of Search ................................. 296/70; 108/45

[56] References Cited

U.S. PATENT DOCUMENTS

| | | | |
|---|---|---|---|
| 2,546,459 | 3/1951 | Lee | 108/45 |
| 2,654,616 | 10/1953 | Mockli | 108/45 |
| 2,792,267 | 1/1957 | Hubbard | 311/21 |
| 3,279,872 | 10/1966 | Howke | 312/235 |
| 3,345,118 | 10/1967 | Cummings | 312/235 |
| 3,589,577 | 6/1971 | Basinger | 224/42.42 |
| 3,606,112 | 9/1971 | Cheshier | 108/45 |
| 3,899,982 | 8/1975 | Fetzek | 108/45 |
| 4,294,384 | 10/1981 | Howell | 224/42.42 |
| 5,092,507 | 3/1992 | Szablak et al. | 224/275 |
| 5,177,665 | 1/1993 | Frank et al. | 61/380 |
| 5,419,265 | 5/1995 | Zimmerman | 108/45 |

FOREIGN PATENT DOCUMENTS

| | | | |
|---|---|---|---|
| 1218314 | 5/1960 | France | 108/45 |
| 891810 | 10/1953 | Germany | 108/45 |
| 50036 | 3/1991 | Japan | 108/45 |
| 667409 | 2/1952 | United Kingdom | 108/45 |

OTHER PUBLICATIONS

Three photographs showing a mock–up of a sliding tray (taken in Jun. 1992).

*Primary Examiner*—Gary C. Hoge
*Attorney, Agent, or Firm*—Leydig, Volt & Mayer, Ltd.

[57] ABSTRACT

An adjustable tray table for a motor vehicle is disclosed. A base is fixed to a dashboard in the vehicle, and a platform is attached to the base. The platform or tray table has two sides and a substantially flat surface, and is adapted for movement between an extended position and a retracted storage position. When in the retracted storage position the platform closely conforms to the contour of the vehicle dashboard, and projects outwardly therefrom when in the extended position. Slidably engaging rails are provided to controllably direct the platform between the active and retracted storage positions.

9 Claims, 2 Drawing Sheets

PASSENGER SLIDING TRAY

REFERENCE TO RELATED APPLICATIONS

This application is a continuation of U.S. Ser. No. 29/033,891 entitled "PASSENGER SLIDING TRAY," which was filed Jan. 23, 1995, now U.S. Design Pat. No. D380,190, issued Jun. 24, 1997.

FIELD OF THE ART

The present invention relates generally to adjustable tables, and more particularly, to an adjustable table in a motor vehicle.

BACKGROUND OF THE INVENTION

More than ever before, today's society is a mobile society in which people virtually "live on the go," frequently living, eating, relaxing, and even working in the confines of a motor vehicle. Indeed, the mobility of today's world has touched all walks of life. To the urban professional, portable computers and cellular phones are as vital as a business suit and a briefcase. Urban sprawl and extended commutes have led many to carpool, and carpooling passengers often utilize the time to work. The flourishing market of drive-up service windows at restaurants, banks, and other businesses, is testimony to societies' ever-growing preference for life in the confines of motor vehicles. Even retirees and vacation travelers have been profoundly affected. In this itinerant group, large recreational vehicles (RVs) provide a home on wheels, and substantial amounts of time are spent in them.

People are spending an ever-growing amount of time inside the confines of motor vehicles of all kinds. Accordingly, there is an increasing demand for personal interior accommodations, beyond just air conditioning and AM/FM radios.

As is known by those skilled in the art, certain working accommodations are presently provided in motor vehicles. For example, motor vehicles are known to provide desks or other workstations having a surface readily disposed for working. Frequently, these workstations are large and cumbersome, and generally rest on the front seat of the motor vehicle or directly on the floor in front of it. Either way, these large workstations displace passenger space and are not readily stowable.

Also known is a collapsible desk table for automobiles, having a desktop that is disposed underneath a dashboard and is adapted to slide out to an extended position. Collapsible legs are hinged at the table to fold down to support the table when extended, and fold away for storage. These legs, however, interfere with passenger leg room when folded down in the extended-support position.

SUMMARY OF THE INVENTION

Accordingly, it is a primary object of the present invention to enhance the comforts and utility of the cabin space of motor vehicles.

In this regard, a more specific object of the present invention is to provide an improved table top or tray to enhance interior motor vehicle accommodations.

Another object of the present invention is to provide a table top or tray that is designed to minimize passenger obstruction and thus maximize interior leg room.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an adjustable tray table assembly for a motor vehicle. The assembly includes a stationary portion or base fixed to a dashboard in the vehicle. A platform is attached to the base and has two sides and a substantially flat surface, and is adapted for movement between an extended position and a retracted storage position. When in the retracted storage position, the platform closely conforms to the contour of the dashboard and, when in the extended position, the platform projects outwardly therefrom in a substantially horizontal orientation. Guide means are further included for controllably directing the platform between the extended and storage positions. In addition, locking means may be provided to lock the tray in its retracted storage position, its extended position, or an intermediate position.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Figure 1:
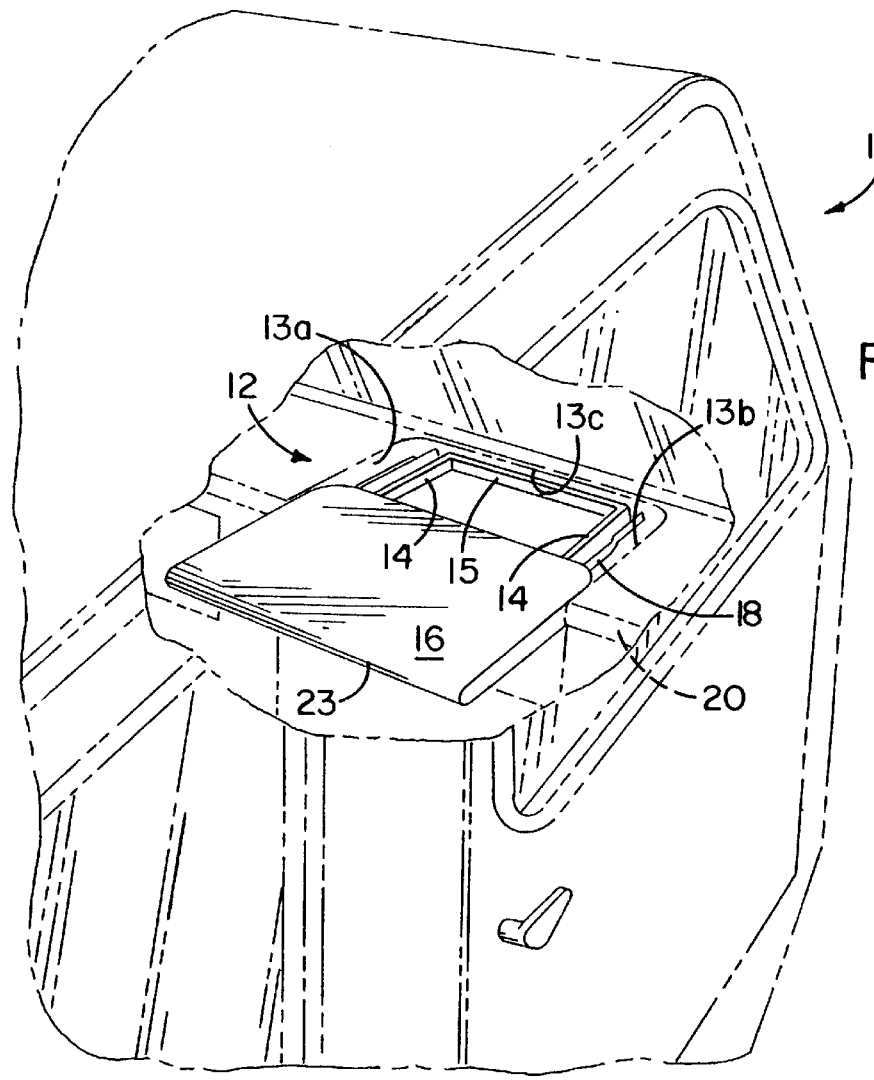
FIG. 1 is a perspective view of the passenger sliding tray and the environment (in broken line) showing the passenger sliding tray mounted in a passenger-side dashboard of a vehicle.

Referring now to the drawings, FIG. 1 shows a sliding tray 12 in accordance with the present invention. The sliding tray 12 is disposed in the front passenger portion of a recreational vehicle 10, which is shown in broken line to illustrate a typical environment for the present invention. It is appreciated, however, that the sliding tray table 12 may be used in many types of vehicles.

The vehicle 10 has a dashboard 20 with a recessed area defined by two sides 13a and 13b and a back 13c for receiving the sliding tray table 12. Generally, the sliding tray table 12 includes a stationary portion or base fixed to the dashboard 20 to support a moving portion that includes a tray or tabletop 16. In the illustrated embodiment, the base comprises, sidewalls 14 and rear ledge 15 which are fixed to the dashboard 20 and support the platform or tray table 16. A pair of side rails 18 and 19 (see also FIG. 5) are disposed in parallel fashion near each side 22 of the tray table 16. A first rail 18 of each pair is attached to the sidewalls 14 of the base, and the second rail 19 (FIG. 5) of each pair is attached to the platform 16.

Preferably, the tray table 16 has a substantially flat surface and a thickness defined by sides 22 and a downwardly extending front lip 23. From the bottom view shown in FIG. 5, it is seen that the sides 22 and lip 23 define a housing which effectively covers rails 19 from normal view. Rails 19 are attached to the bottom facing surface of sides 22, and cooperate with rails 18 to serve as a guide means that defines a controlled path of movement of tray table 16 between an extended position and a retracted storage position.

In the preferred embodiment, rails 18 and 19 slidingly engage to form a travel path in a manner well known and used, for example, in a typical desk drawer. In this regard, the rails 18 and 19 are telescoped for extension and retraction. It is appreciated that, consistent with the broad concepts and teachings of the present invention, other means for slidably supporting the tray table 16 may be provided. For example, a single, centrally disposed rail pair may slidably attach the tray table 16 to the dashboard 20 for reciprocal movement of the tray table 16 between an extended position and a retracted storage position.

It is further appreciated that a locking means may be provided to lock the tray table 16 in either the retracted storage position or the extended position. In the illustrated embodiment, a locking means is shown at 30, which cooperates with a mating portion (not shown) on the tray table 16 to hold the tray table 16 in the retracted storage position. It will be appreciated by those skilled in the art that other methods may be used to lock or retain the tray 16 in any given position. For example, the rails 18 and 19 may be configured in a relatively tight friction-fit engagement, effectively locking or steadfastly holding the tray table 16 in any intermediate position. Further still, the rails 18 and 19 may be slotted to receive a bolt and wing-nut, wherein tightening the wing-nut would serve the lock the tray table 16 in position.

It is understood that the flat surface of tray table 16 provides a conducive space for a variety of activities. Indeed, the surface may be used for writing, eating, or even computing with a portable computer. Furthermore, the variable extension of the tray table 16 provides greater passenger comfort by extending to permit the passenger to remain in a recumbent position while eating, working, or otherwise utilizing the tray table 16. In this regard, the tray table 16 may be substantially flat (as illustrate) to provide a good writing surface. Alternatively, the tray table 16 may include cylindrical or other recesses for holding drinking cups. Further still, recesses may be provided in the dashboard 20 underneath the tray table 16, wherein the recesses are exposed when the tray table 16 is extended. It is appreciated that this configuration would provide a good, flat writing surface while, at the same time, provide holders for drinking cups.

Figure 2:
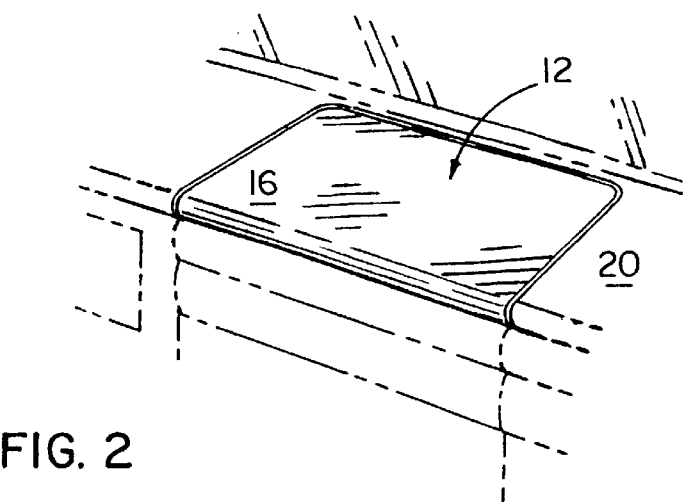
FIG. 2 is an upper right hand perspective view of the passenger sliding tray shown in its closed position.
Figure 3:
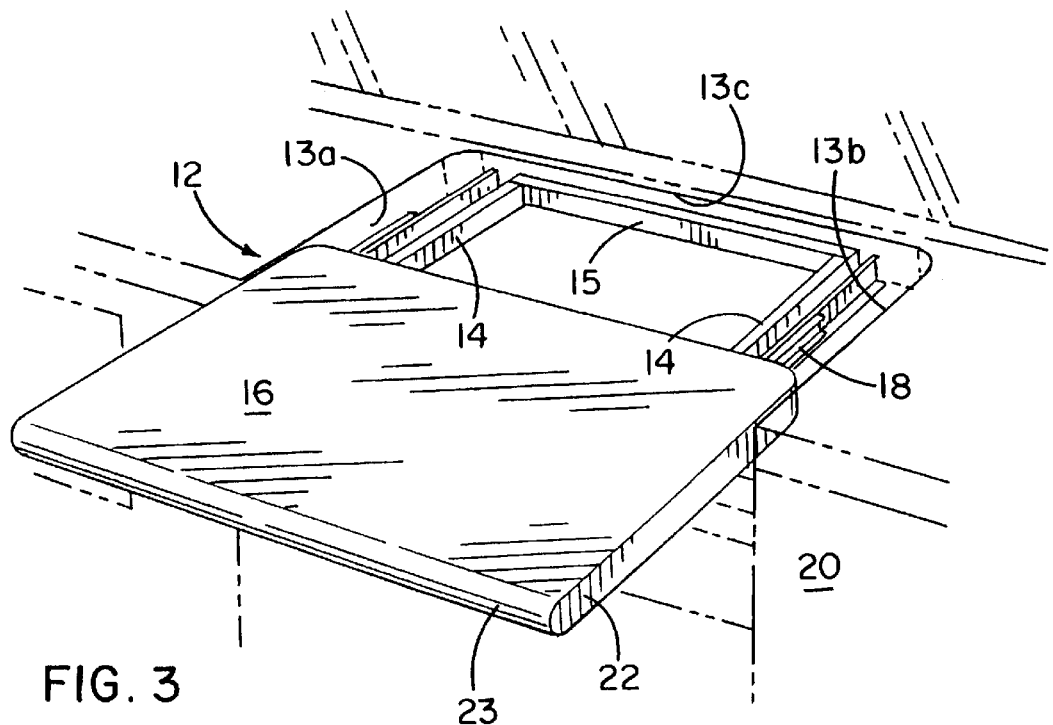
FIG. 3 is an upper right hand perspective view of the passenger sliding tray shown in its open position.
Figure 4:
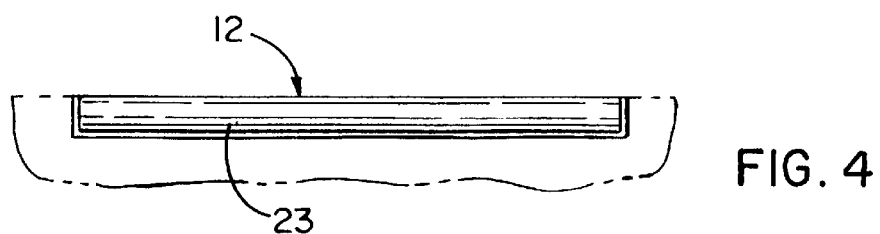
FIG. 4 is a front end view of the passenger sliding tray.
Figure 5:
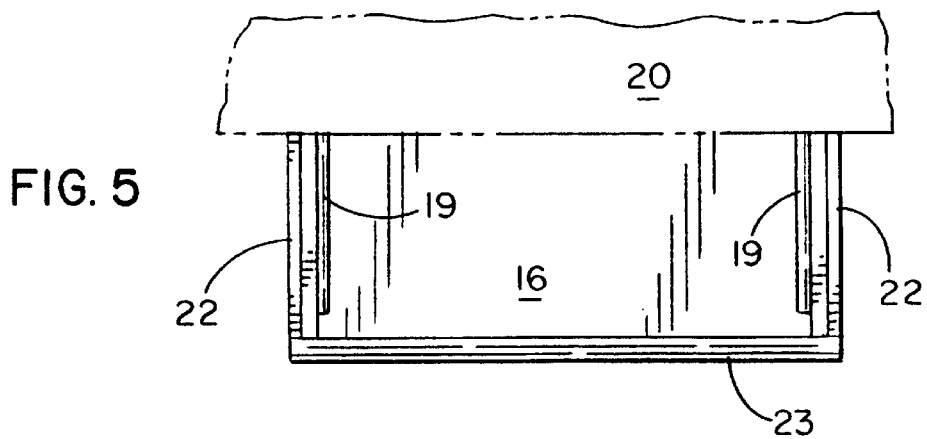
FIG. 5 is a bottom view of the passenger sliding tray in its open position.

Reference is now made to FIGS. 1–3 which show the tray table 16 and the surrounding interior of an RV. FIG. 2 shows the tray table 16 in its retracted storage position, and FIGS. 1, 3 and 5 shows the tray table 16 in its extended position. The front lip 23 is curved to smoothly flow into the surface of the tray table 16. As shown, when in the retracted storage position, the tray table 16 substantially conforms to the contour of the dashboard 20. This not only adds to the aesthetic quality of the vehicle interior, but also advantageously serves to prevent clothing or other articles from hanging when entering or exiting the vehicle.

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, the illustrated embodiment describes the invention in connection with the environment of a recreational vehicle. The invention, however, can be equally applied to any type of motor vehicle, including cars and trucks.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An adjustable tray table assembly for use with a dashboard in a motor vehicle comprising:

a base fixed to the dashboard;

a platform attached to the base and having two sides and a substantially flat surface, the platform being adapted for movement between an extended position and a retracted storage position wherein the surface is unobstructed in the retracted position so that the platform may be used in both the extended and retracted positions and wherein the platform closely conforms to the contour of the dashboard when in the storage position and projects out from the dashboard when in the extended position; and guide means for controllably directing the platform between the extended and storage positions.

2. The adjustable table according to claim 1, wherein the guide means includes at least pair of parallel rails attached between the platform and the dashboard.

3. The adjustable table according to claim 2, wherein one rail of the at least one pair of rails is attached to the base, and the other rail of the at least one pair is attached to the platform.

4. The adjustable table according to claim 3, wherein the two rails comprising the at least one pair of rails slidingly engage to facilitate movement of the platform between the extended and storage positions.

5. The adjustable table according to claim 4, wherein the movement of the platform between the extended and storage positions is a substantially horizontal sliding movement, the platform being substantially horizontally disposed when in the extended position.

6. The adjustable table according to claim 3, wherein two pair of rails are provided, with one pair being disposed near each side of the platform.

7. A motor vehicle dashboard for use with sliding tray table comprising:

two sides and a back defining a recessed area for receiving a tray table;

a base fixed to the recessed area;

a platform attached to the base, the platform being adapted for movement between an extended position and a retracted storage position wherein the surface is unobstructed in the retracted position so that the platform may be used in both the extended and retracted positions; and at least one pair of parallel rails being substantially horizontally disposed and attached between the platform and the recessed area, the parallel rails adapting the platform for reciprocal movement between the extended position and the retracted storage position, the platform being entirely supported by the at least one pair of rails.

8. The dashboard according to claim 7, further including at least one cylindrical depression disposed in the recessed area for receiving and supporting at least one drinking cup.

9. The dashboard according to claim 7, wherein two pair of rails are provided, with one pair being disposed near each side of the platform.

* * * * *